Figure 1:
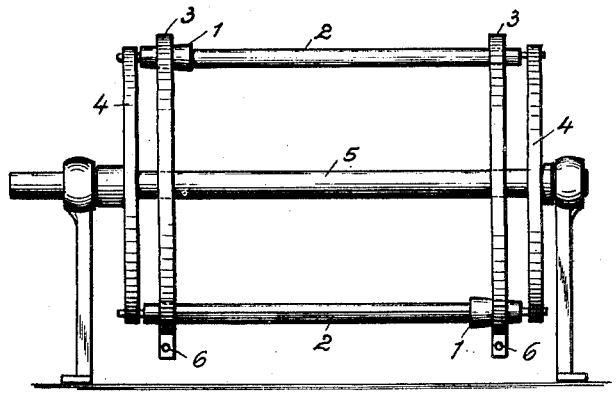

May 5, 1953

P. KOHL 2,637,092

DRIVE FOR BRUSHING CYLINDERS OR ROUGH ROLLS IN TEASELING MACHINES

Filed Oct. 9, 1950

3 Sheets-Sheet 1

Inventor:
Peter Kohl

BY Watson, Cole, Grindle & Watson
Attorneys

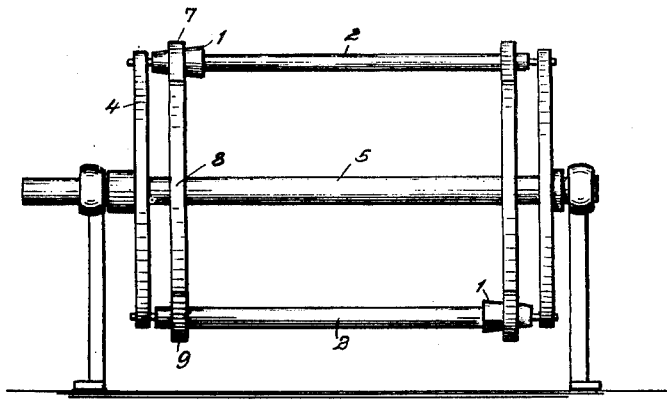
Fig. 2
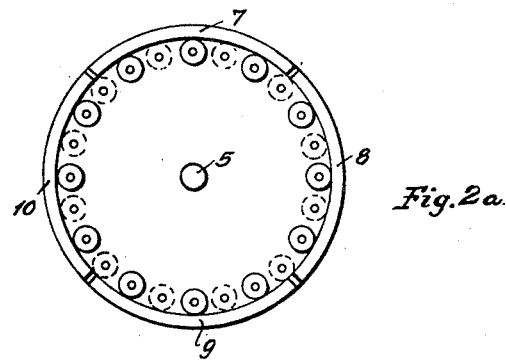
Fig. 2a.
Fig. 4
Fig. 5
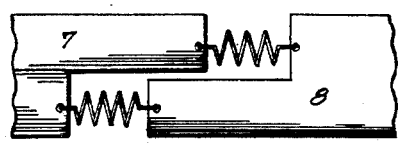
Inventor:
Peter Kohl
By Watson, Cole, Grindle & Watson
Attorneys

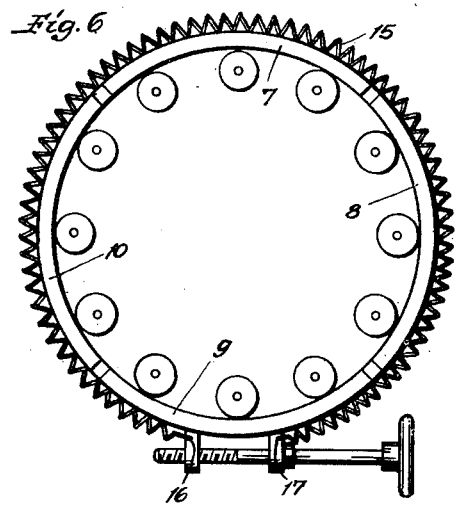
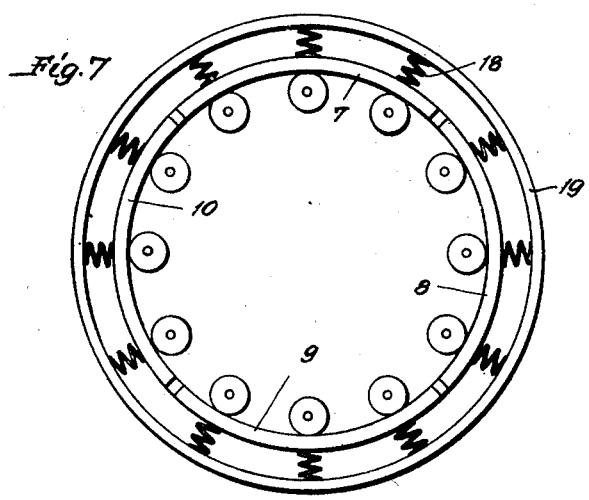

Patented May 5, 1953

2,637,092

UNITED STATES PATENT OFFICE 2,637,092

DRIVE FOR BRUSHING CYLINDERS OR ROUGH ROLLS IN TEASELING MACHINES

Peter Kohl, Munchen-Gladbach, Germany, assignor to A. Monforts, Munchen-Gladbach, Germany, a firm Application October 9, 1950, Serial No. 189,184
In Germany October 19, 1949

4 Claims. (Cl. 26—35)

The brushing cylinders or rough rolls of so-called beltless teaseling machines are generally driven by driving cones of the brushing cylinders rolling along the inner circumference of a friction ring tensioned around them. The brushing cylinders are supported on opposite sides in so-called drum heads which, in turn, are firmly connected with the axis and are driven by the latter in opposite directions.

It is of importance that the brushing cylinders rotate with an exactly constant number of revolutions and for this purpose it is necessary that all cones engage the friction rings with an absolutely equal pressure.

It has proved that this aim cannot be reached with the devices known up to now, as the friction rings of the known constructions cannot be pressed equally against all driving cones engaging them. These friction rings made of one piece do not fully surround the rim formed by the driving cones, but the friction ring is slotted and has the opposite ends connected with each other by a tensioning or adjusting device. If the ends and therewith also the friction ring itself are tensioned by means of this device the pressure cannot be distributed along the whole circumference and therefore cannot act equally onto all cones.

It is a problem of the present invention to remove these disadvantages. According to the invention this is achieved by subdividing the friction rings and in this way creating the conditions for an equal pressure along the whole circumference of the friction rings onto the driving means running in their interior. To realize the invention and to fulfill its purpose several ways are possible.

According to one feature of the invention the single elements of the friction rings are yieldingly connected with each other either by two opposite segments being connected by springs or by arranging springs between the single segments. However, according to the invention there is a possibility to arrange only one continuous spring surrounding the friction elements, whereby the ends of the springs may be connected with each other by an adjusting or tensioning device and, in this way, the frictional pressure may be changed.

A further feature of the invention is to cause pressure springs to act upon the single segments of the friction rings, said pressure springs abutting against a further ring surrounding the springs, said latter ring being changeable if desired with respect to its diameter for the purpose to produce different friction pressures.

In order to create a continuous running surface for the rotating driving cones according to the invention the ends of the single friction segments engage each other.

Further details of the invention may be seen from the following description of a plurality of embodiments of the invention illustrated in the accompanying drawings.

Figure 1A:
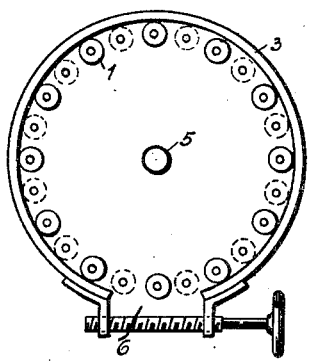

In the drawings:

Fig. 1 is a side view and Fig. 1a is a front view of the known construction.

Figure 3:
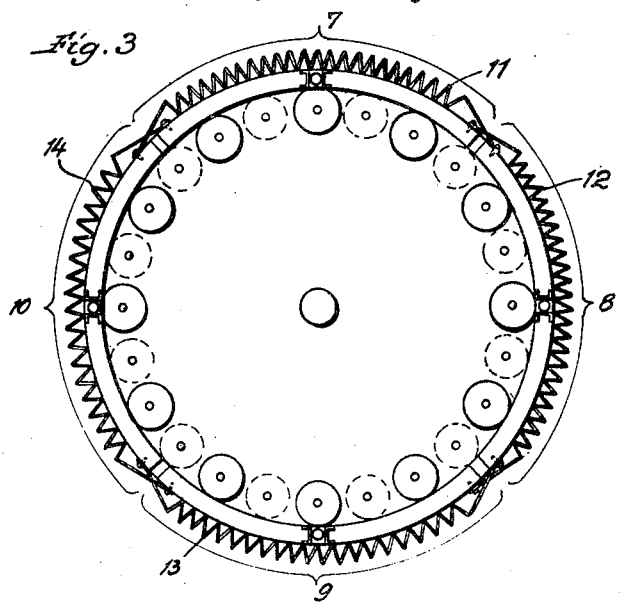

Fig. 2 is a side view and Fig. 2a is a front view of an embodiment of the invention the spring arrangement causing the pressure being omitted, Fig. 3 is a front view of the drive according to Fig. 2 including the spring arrangement for the pressure and in an enlarged scale, Fig. 4 shows the engaging ends of two neighbouring friction ring segments, Fig. 5 is a detail similar to Fig. 4 in an enlarged scale, draw-springs being inserted, Fig. 6 is a front view of a modified construction of the drive.

Fig. 7 is a further embodiment of the device in a front view.

The drive of a brushing cylinder or rough roll shown in Fig. 1 corresponds to the known state of the art. The driving cones 1 of the brushing cylinder roll are within a friction ring 3 laid around them. The brushing cylinder comprises rotatable brushing shafts 2 supported on opposite ends by drum heads 4 firmly connected with the shaft 5 and driven by it in either direction, as desired.

The practice has shown as already stated, that with this known construction the friction rings 3 cannot be pressed equally against all driving cones engaging them. The friction rings made of one piece and being interrupted at 6 are tensioned only at this place so that the pressure cannot be distributed equally along the whole circumference and thus cannot act on all cones in the same way.

The conditions change principally if, according to the invention, the friction ring is subdivided into single segments. As can be seen from Fig. 2a, the section rings are composed of four portions 7, 8, 9 and 10. The segments are pressed against the cones under the action of draw-springs 11—14 (Fig. 3) in such a way that always two opposite segments are connected by draw-springs, so, segments 7 and 9 on the one hand and segments 8 and 10 on the other hand are resiliently connected with each other. As the ends of the single segments are stepped as shown in Fig. 4, and engage each other completely closed friction rings are formed being under a perfectly equal pressure along their whole circumference. A further advantage of these closed rings is that the driven cones are continuously in contact with the friction rings during their rotation, i. e. they are continuously driven, thereby causing an always constant number of rotations of the brushing cylinders.

According to the embodiment of the invention shown in Fig. 5 the segment ends 7 and 8 are directly connected with each other by means of draw-springs. Also in this way an equal pressure of the friction rings against the driving cones may be obtained.

A further embodiment of the invention is shown in Fig. 4 where only one draw-spring 15 embraces the segments of the friction rings and in this case the ends 16 and 17 of the draw-spring may be held together by a tensioning or adjusting device with the result that not only a practically sufficiently equal pressure is attained but moreover this pressure may be differently adjusted. In case the equality of the pressure should not be fully reached with this construction the spring itself may be subdivided and a connection corresponding to the described adjusting and tensioning device may be provided at a place diametrically opposite to the mentioned device.

According to Fig. 7 a plurality of pressure springs 18 is equally distributed around the circumference of the friction ring. The springs abut against the ring 19, the diameter of which may be changeable in any suitable way so that the pressure being equal per se may be differently adjusted.

The invention is not restricted to the illustrated embodiments, it is however an essential feature of the invention that by subdividing the friction rings the conditions are given to obtain an equal pressure around the whole circumference onto the driving means running along the inner ring surface.

Having thus particularly described the nature of my invention and the manner in which it is to be performed, what I claim to have covered by Letters Patent is:

1. A drive of a brushing cylinder in teaseling machines comprising in combination with a brushing cylinder supporting a plurality of brushing shafts and an axle supporting said cylinder, driving cones arranged on said brushing shafts, a friction ring comprising a plurality of segments within which the driving cones roll, and spring means connecting said segments with each other and adapted to uniformly press said segments against said driving cones.

2. A drive of a brushing cylinder as claimed in claim 1, said spring means consisting of a plurality of tension springs each connecting two opposite segments with each other.

3. A drive of a brushing cylinder as claimed in claim 1, said spring means comprising a single tension spring surrounding said segments.

4. A drive of a brushing cylinder as claimed in claim 3, including adjusting and tensioning means connecting the ends of the spring.

PETER KOHL.

References Cited in the file of this patent

UNITED STATES PATENTS

| Number | Name | Date |
|---|---|---|
| 459,521 | Grosselin | Sept. 15, 1891 |
| 1,173,565 | Ermbter | Feb. 29, 1916 |

FOREIGN PATENTS

| Number | Country | Date |
|---|---|---|
| 295,291 | Germany | Nov. 15, 1916 |
| 295,628 | Germany | Dec. 12, 1916 |